March 23, 1943.                J. GAMBINO                2,314,617
                         DOLLY BLOCK CONSTRUCTION
                            Filed Dec. 1, 1941

INVENTOR.
JOSEPH GAMBINO
BY
ATTORNEY

Patented Mar. 23, 1943

2,314,617

UNITED STATES PATENT OFFICE 2,314,617

DOLLY BLOCK CONSTRUCTION

Joseph Gambino, Cleveland, Ohio, assignor to The Fairmount Tool and Forging Co., Cleveland, Ohio, a corporation of Ohio Application December 1, 1941, Serial No. 421,163

1 Claim. (Cl. 81—15)

This invention relates to the art of bending or straightening out sheet metal, and more particularly to a new and improved dolly block or hand anvil for use in removing dents and bumps from sheet metal automobile panels such as hoods, fenders and body sections.

The modern practice of manufacturing sheet metal automobile panels involves the use of deep-drawing steels which are preferably die-formed to impart thereto the desired shape to make the particular panels. The metal of such a die-formed panel has a certain amount of elasticity and has die-formed strains throughout its entire area which tend to hold the panel in the particular die-formed shape. When a panel is damaged, new strains caused by the damaging force are set up within the metal of the panel and tend to hold the damage in place, preventing it from springing back to its normal shape. The method of repairing such damage is to unlock or release the damage strains one by one, caused by the damaging force, and take advantage of the die-formed strains and elasticity of the metal to return the metal to its normal die-formed shape.

The principal tools used for this work are a dinging hammer and a dolly block or hand anvil. The working surface of the dolly block is so constructed that different portions thereof will conform to the contour of different portions of the sheet metal structure under repair. The dolly is held against one surface of the sheet metal while hammer blows are delivered to the opposite face of the metal. The hammer is caused to strike the surface of the panel under repair with a glancing blow so as to rebound quickly from the surface of the metal, permitting it to vibrate. The vibration thus set up in the panel aids the damaged portion to return to its normal die-formed shape. With the striking of each blow of the hammer, the dolly is caused to kick away slightly from the surface of the metal, but it returns immediately because of tension in the operator's arm. An unbalanced dolly and/or misdirected blows cause the dolly to kick off to one side or the other, making it substantially impossible to accurately position the dolly for the succeeding hammer blow without wasting time and quality of workmanship. If the operator holds the bumping surface of the dolly against the surface of the panel with sufficient pressure to overcome the kick off following a hammer blow, stretching of the metal results, thereby increasing the damage and precluding the return thereof to the original form.

By the present invention, there is provided a new and improved dolly block or hand anvil which overcomes many of the undesirable features of prior types of dolly blocks, contributes to efficient, economic and high grade workmanship. The dolly block of this invention is so constructed that when used to remove indentations or bumps from sheet metal automobile panels, the metal of the panel cannot be stretched due to improper use of the tools; it prevents shock and undue fatigue to the operator's arm holding the dolly block in position, and permits working in areas inaccessible heretofore with present day tools.

Various objects of the invention not at this time particularly enumerated will become more apparent after the nature of the invention is better understood from the following detailed description taken in conjunction with the accompanying drawing, wherein.

Figure 1:
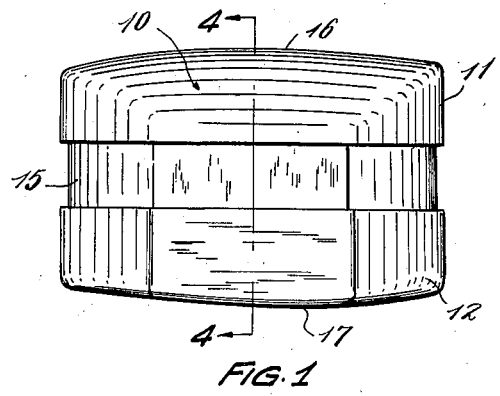
Figure 1 is a side elevational view of a dolly block constructed in accordance with this invention.
Figure 2:
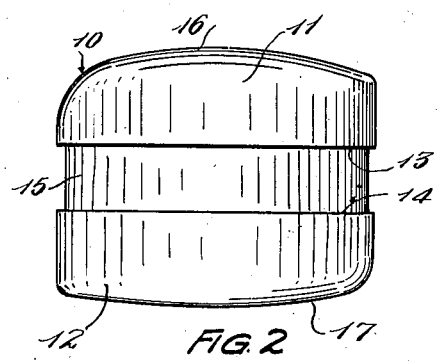
Figures 2 and 3 are end elevation and top plan views, respectively, of the dolly block of Figure 1.
Figure 3:
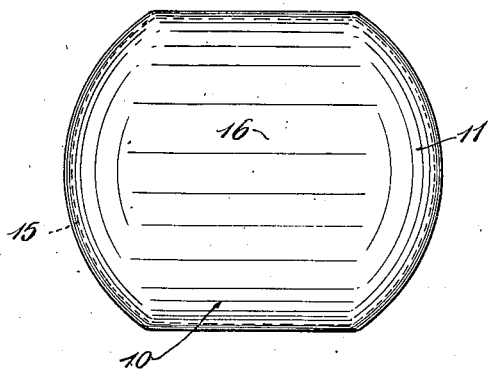
Figure 4:
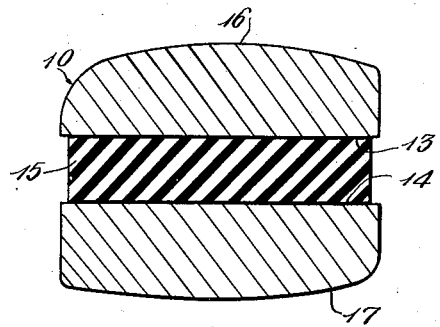
Figure 4 is a sectional view taken on the line 4—4 of Figure 1.

With reference to the accompanying drawing, the number 10 broadly indicates a preferred form of dolly block constructed in accordance with the teaching of this invention. The dolly block 10 comprises a pair of spaced hand anvil members 11 and 12 having opposed parallel faces 13 and 14 which are secured together by means of a resilient cushion member 15. The anvil member 11 has its outer working surface 16 contoured to fit sheet metal having a substantially high crowned surface formed therein, and the anvil member 12 has its outer working surface 17 contoured to work on sheet metal surfaces having a substantially low crowned surface. The resilient cushion member 15 may be made of any suitable material or construction, however, I have found sponge rubber preferable. The opposite surfaces of the cushion member 15 when composed of a rubber composition may be vulcanized to the faces 13 and 14 of the respective anvil members by a process known in the trade as "Vulcalock."

In using the dolly block of the present invention, the operator places against the sheet metal surface under repair the working surface of the desired member 11 or 12 to fit the contour of the metal surface, the anvil member not in use serving as a handle to hold the dolly in position.

As the hammer is caused to strike the opposite face of the work, the resilient member 15 depresses under the blow and quickly rebounds the working face of the anvil member against the metal surface, thereby giving an added blow, the vibration of which hastens the metal bumping operation. By the use of my dolly, the operator is able to exert continuous tension in holding the dolly block against the surface of the metal being worked without fear of any stretching of the metal due to a dead blow being imparted to the metal. Furthermore, the operator can hold the dolly block in heretofore inaccessible places due to the fact that it is not necessary to afford any room to allow for kick off of the dolly block following a blow. Moreover, the tendency to injure the operator's hand holding the block is thereby minimized. It will be seen by the construction of dolly herein provided that two separate and distinct working or bumping surfaces are provided in one dolly block.

Having thus described my invention, what I desire to obtain by Letters Patent is defined in the appended claim.

What I claim is:

A dolly comprising spaced bumping heads having convex working surfaces formed on the outer faces thereof and opposed parallel inner faces, and a resilient member intermediate said inner faces having its opposite surfaces bonded to adjacent faces of the bumping heads whereby when the dolly is in service one of said bumping heads serves as a support to hold the other of said bumping heads against a member being worked upon and said resilient member serves to return and maintain the head against the surface of the member after successive blows are imparted thereto.

JOSEPH GAMBINO.